United States Patent
Jhang

(10) Patent No.: US 10,949,348 B2
(45) Date of Patent: Mar. 16, 2021

(54) STORAGE DEVICE AND CACHE AREA ADDRESSING METHOD

(71) Applicant: SILICON MOTION, INC., Zhubei (TW)

(72) Inventor: Yi-Shou Jhang, Taipei (TW)

(73) Assignee: SILICON MOTION, INC., Zhubei (TW)

( * ) Notice: Subject to any disclaimer, the term of this patent is extended or adjusted under 35 U.S.C. 154(b) by 0 days.

(21) Appl. No.: 16/536,631

(22) Filed: Aug. 9, 2019

(65) Prior Publication Data

US 2020/0110701 A1    Apr. 9, 2020

Related U.S. Application Data

(60) Provisional application No. 62/719,908, filed on Aug. 20, 2018.

(30) Foreign Application Priority Data

Nov. 27, 2018   (TW) .................................. 107142242

(51) Int. Cl.
*G06F 12/00*   (2006.01)
*G06F 12/0811*   (2016.01)
(Continued)

(52) U.S. Cl.
CPC ...... *G06F 12/0811* (2013.01); *G06F 12/0873* (2013.01); *G06F 13/1673* (2013.01); *G06F 2212/7201* (2013.01)

(58) Field of Classification Search
CPC combination set(s) only.
See application file for complete search history.

(56) References Cited

U.S. PATENT DOCUMENTS

| 6,119,204 A | 9/2000 | Chang et al. |
| 8,417,839 B1 | 4/2013 | Ng et al. |

(Continued)

FOREIGN PATENT DOCUMENTS

| TW | 201346755 A | 11/2013 |
| TW | I592865 B | 7/2017 |

(Continued)

OTHER PUBLICATIONS

Taiwanese Office Action and Search Report dated Dec. 10, 2019, for Taiwanese Application No. 107142242.

(Continued)

*Primary Examiner* — Yong J Choe
(74) *Attorney, Agent, or Firm* — Birch, Stewart, Kolasch & Birch, LLP

(57) ABSTRACT

A storage device and a cache area addressing method is disclosed. The storage device includes a memory module, a buffer, a memory controller, and a cache area addressing circuit. The buffer includes a cache area. The memory controller is coupled to the memory module and the buffer. The cache area addressing circuit is coupled to the memory controller and the buffer and configured to perform the followings. A logical address from the memory controller is received. Whether the logical address corresponds to a logical address interval of the cache area is determined. When the logical address corresponds to the logical address interval of the cache area, the logical address is mapped to a first physical address in the cache area according to a base address. Otherwise, the logical address is mapped to a second physical address in the buffer.

10 Claims, 5 Drawing Sheets

(51) Int. Cl.
*G06F 13/16* (2006.01)
*G06F 12/0873* (2016.01)

(56) References Cited

U.S. PATENT DOCUMENTS

| | | |
|---|---|---|
| 2005/0223172 A1 | 10/2005 | Bortfeld |
| 2008/0294867 A1* | 11/2008 | Kimura ............... G06F 12/1027 711/204 |
| 2008/0294986 A1 | 11/2008 | Seo et al. |
| 2010/0262721 A1 | 10/2010 | Asnaashari et al. |
| 2015/0095615 A1 | 4/2015 | Abdallah et al. |
| 2015/0234601 A1 | 8/2015 | Tsai et al. |
| 2016/0378493 A1 | 12/2016 | Burger et al. |
| 2017/0228167 A1 | 8/2017 | Manohar et al. |
| 2018/0024738 A1 | 1/2018 | Ngu |
| 2018/0129415 A1* | 5/2018 | Igahara ............... G06F 12/0246 |

FOREIGN PATENT DOCUMENTS

| | | |
|---|---|---|
| TW | I636399 B | 9/2018 |
| WO | WO 03/005716 A1 | 1/2003 |
| WO | WO 2012/040045 A2 | 3/2012 |

OTHER PUBLICATIONS

Taiwanese Office Action and Search Report, dated Jul. 9, 2020, for Taiwanese Application No. 108101642.

O'Reilly, "Memory Mapping and DMA", URL: https://www.oreilly.com/library/view/linux-device-drivers/0596005903/ch15.html, Apr. 7, 2019, 57 pages.

U.S. Office Action, dated Dec. 16, 2020, for U.S. Appl. No. 16/535,830.

* cited by examiner

STORAGE DEVICE AND CACHE AREA ADDRESSING METHOD

This application claims the benefit of U.S. Provisional Application Ser. No. 62/719,908, filed Aug. 20, 2018, and Taiwan application Serial No. 107142242, filed Nov. 27, 2018, the subject matter of which is incorporated herein by reference.

BACKGROUND OF THE INVENTION

Field of the Invention

The invention relates in general to a storage device and a cache area addressing method.

Description of the Related Art

Solid-state drive (SSD) is a commonly used storage device. Let the NAND solid-state drive be taken for example. The system architecture of the NAND solid-state drive normally includes a memory controller, a non-volatile memory and a buffer, wherein the buffer normally is implemented by volatile memory. According to the existing technology, the memory controller uses a part of the buffer as a cache. However, along with the increase in the capacity of the non-volatile memory, the size of the buffer also needs to increase. Since the memory controller has a limited addressing ability, the mapping scope of the memory controller cannot map to the physical address within the entire buffer. The buffer needs to be divided into multiple banks which are selected by a register. Under such architecture, when the memory controller performs a cache operation to the buffer, the memory controller may cache an erroneous physical address if the register is not set to a correct value.

SUMMARY OF THE INVENTION

The invention is directed to a storage device and an operating method thereof.

According to one embodiment of the present invention, a storage device is disclosed. The storage device includes a memory module, a buffer, a memory controller and a cache area addressing circuit. The buffer includes a cache area. The memory controller is coupled to the memory module and the buffer. The cache area addressing circuit is coupled to the memory controller and the buffer, and is configured to perform the followings. A logical address is received from the memory controller. Whether the logical address corresponds to a logical address interval of the cache area is determined. When the logical address corresponds to the logical address interval of the cache area, the logical address is mapped to a first physical address in the cache area according to a base address. When the logical address does not correspond to the logical address interval of the cache area, the logical address is mapped to a second physical address in the buffer.

According to another embodiment of the present invention, a cache area addressing method is disclosed. The method includes the following steps. A logical address from a memory controller is received by a cache area addressing circuit. Whether the logical address corresponds to a logical address interval of a cache area of a buffer is determined by the cache area addressing circuit. When the logical address corresponds to the logical address interval of the cache area, the logical address is mapped to a first physical address in the cache area by the cache area addressing circuit according to a base address. When the logical address does not correspond to the logical address interval of the cache area, the logical address is mapped to a second physical address in the buffer by the cache area addressing circuit.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
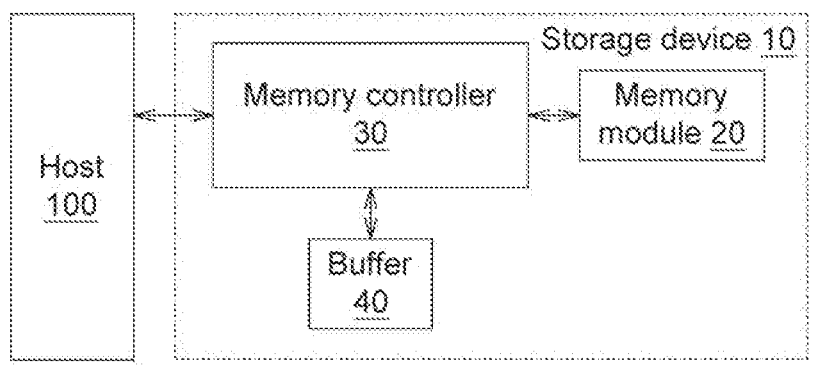
FIG. 1 is a block diagram of a storage device according to an embodiment of the present invention.

Referring to FIG. 1, a block diagram of a storage device according to an embodiment of the present invention is shown. In an actual example, the storage device 10 includes a memory module 20, a memory controller 30 and a buffer 40. The memory controller 30 can perform a data access operation to the memory module 20 according to a host instruction outputted from the host 100. For example, the memory controller 30 stores the user data from the host 100 to the storage space of the memory module 20, or reads the user data from the memory module 20 and further outputs the user data to the host 100. The host instruction, which complies with, for example, the non-volatile memory express (NVMe) storage device standard or the advanced host controller interface (AHCI) standard instruction, can transmit data through a peripheral component interconnect express (PCIE) transmission interface, a serial ATA (SATA) transmission interface or a serial attached SCSI (SAS) transmission interface.

The memory module 20 preferably includes a memory with long-term data storage ability, for example, flash memory, magnetoresistive random access memory (magnetoresistive RAM), ferroelectric random-access memory (ferroelectric RAM), resistive random-access memory (resistive RAM) and/or spin transfer torque random access memory (STT-RAM).

The storage device 10 further includes a buffer 40 configured to temporarily store the data required for the operation of the storage device 10. The data is, for example, the user data outputted from the host 100, the programming code or table required for the operation of the memory controller 30. The table is, for example, the logical to physical mapping table (the L2P mapping table) or the bitmap recording the state of the L2P mapping table. Each bit of the bitmap maps to the update state of one of the groups in the L2P mapping table. The buffer 40 preferably is implemented by dynamic random-access memory (DRAM) or static random-access memory (SRAM) having the features of low cost, fast speed and low capacity. However, the buffer 40 can also be realized by a memory having the features of high cost, fast speed and long-term storage ability. In the following descriptions, the buffer 40 is exemplified by the DRAM, but the present invention is not limited thereto.

Figure 2:
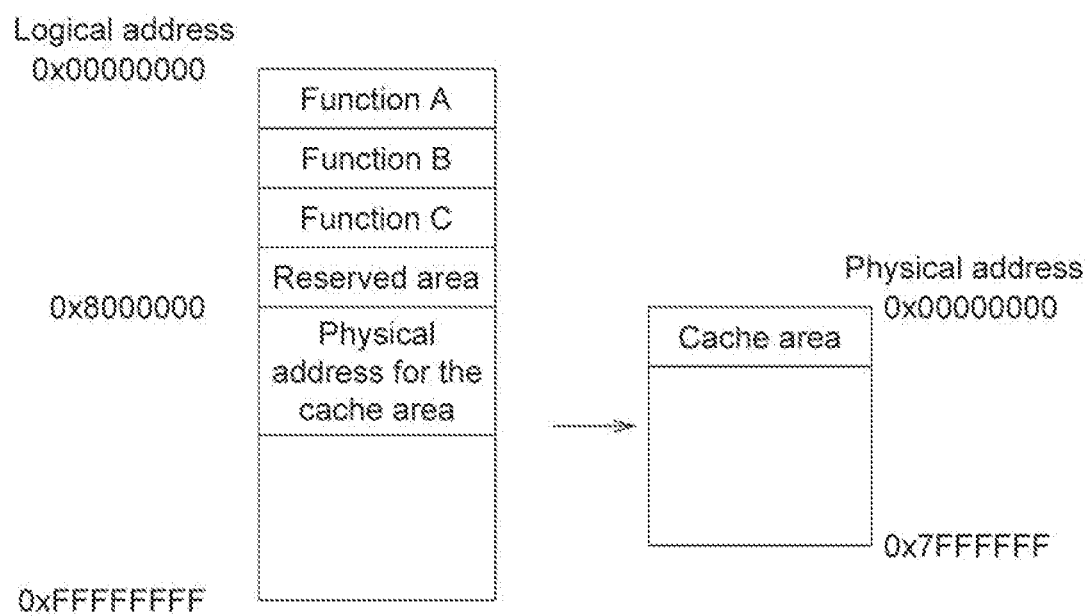
FIG. 2 is a schematic diagram of an example of logical address arrangement.

FIG. 2 is a schematic diagram of an example of logical address arrangement. To effectively use the storage space of the buffer 40, the user can arrange the logical address of the data beforehand and then maps the logical address to the physical address in the buffer 40. Suppose the logical address has 4 GB data to be mapped to the physical address. The logical addresses 0x0000,0000 to 0x7FFF,FFFF are arranged as a system storage area for storing the system data of different functions. For example, the function A block is used as a storage area for programming code; the function B block is used as a storage area for L2P mapping table; the function C block is used as a storage area for bitmap; the remaining area is referred as "system reserved area". The logical addresses 0x8000,0000 to 0xFFFF,FFFF are arranged as a universal storage area for temporarily storing the user data outputted from the host 100, for example. Under such arrangement, with proper management of the mapping information between the logical address and the physical address, the memory controller 30 can correctly access data in the buffer 40.

Besides, the user data outputted from the host 100 is preferably represented by logic block addresses, and each logic block address represents an item of data with a fixed size, such as 512 B or 4 KB. The user data can be represented by 512 or 4K continuous logical addresses.

To increase the efficiency of the memory controller 30, a cache is arranged in the universal storage area. For example, the logical addresses 0x8000,0000 to 0x9FFF,FFFF are configured to temporarily store the data or programs required for the operation of the memory controller 30 to speed up the access of data or programs. Under such arrangement, if the buffer 40 of the storage device 10 has a size of 2 GB, then the logical addresses 0x8000,0000 to 0xFFFF,FFFF can be mapped to the physical addresses 0x0000,0000 to 0x7FFF,FFFF in the buffer 40, and the logical addresses 0x8000,0000 to 0x9FFF,FFFF of the cache area can be directly mapped to the physical addresses 0x0000,0000 to 0x1FFF,FFFF in the buffer 40.

Figure 3:
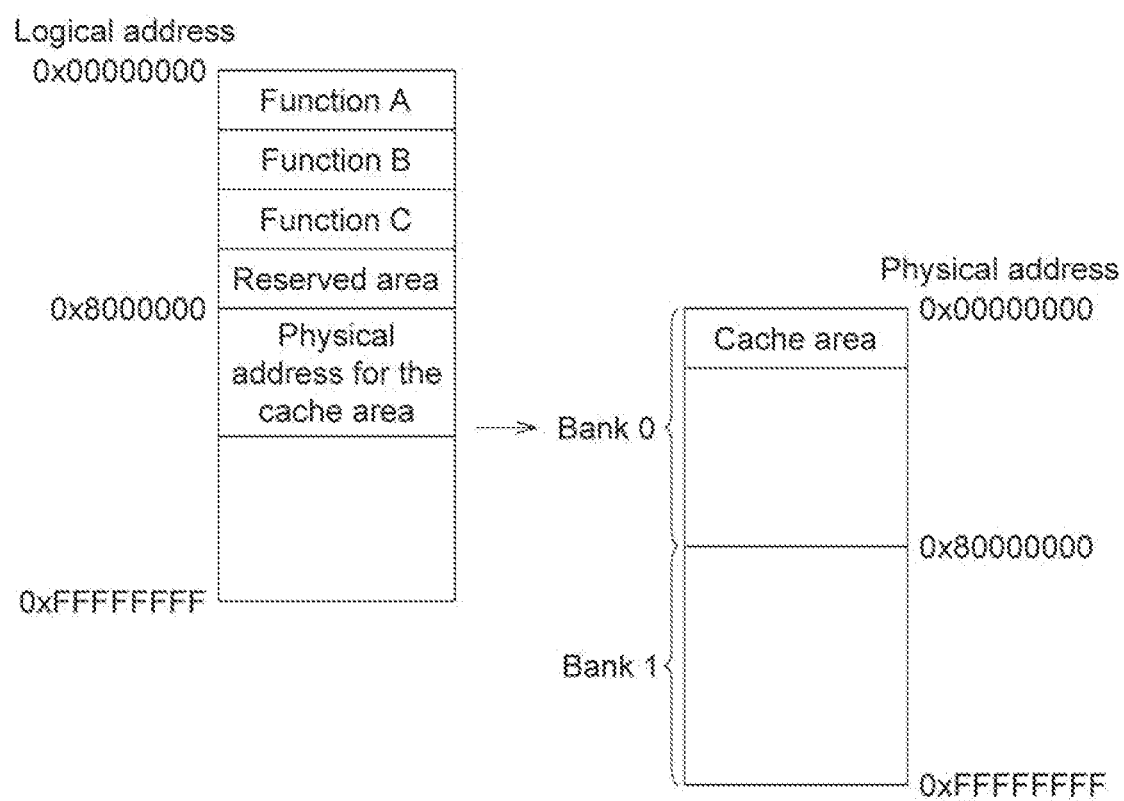
FIG. 3 is a schematic diagram of another example of logical address arrangement.

However, the arrangement as indicated in FIG. 2 is only applicable to the buffer 40 having a size of 2 GB. If the size of the buffer 40 changes to 4 GB or 8 GB, then the cache area will be addressed erroneously. When the buffer 40 has a size greater than 2 GB (for example, the buffer 40 has a size of 4 GB with physical addresses 0x0000,0000 to 0xFFFF,FFFF as indicated in FIG. 3), the memory controller 30 divides the 4 GB storage space into 2 banks. Each bank has a size of 2 GB with physical addresses 0x0000,0000 to 0x7FFF,FFFF. By properly setting the value of the register, the memory controller 30 can switch between the 2 banks to access the 4 GB storage space. For example, when the value of the register is set as 0, the processor 104 can access the 2 GB storage space of bank 0; when the value of the register is set as 1, the processor 104 can access the 2 GB storage space of bank 1. Assume that the cache area is mapped to the physical addresses 0x0000,0000 to 0x1FFF,FFFF in the bank 0, and the memory controller 30 accesses the user data in the bank 1. When accessing the cache area, the memory controller 30 does not automatically change the value of the register, and therefore will access the physical addresses 0x0000,0000 to 0x1FFF,FFFF of bank 1 instead of accessing the physical addresses physical addresses 0x0000,0000 to 0x1FFF,FFFF of bank 0. Such error is referred as "cache area addressing error". Therefore, when the buffer 40 has a size greater than 2 GB, the memory controller 30 needs to use a correct cache area address method to avoid the problem of cache area addressing error mentioned above.

Figure 4:
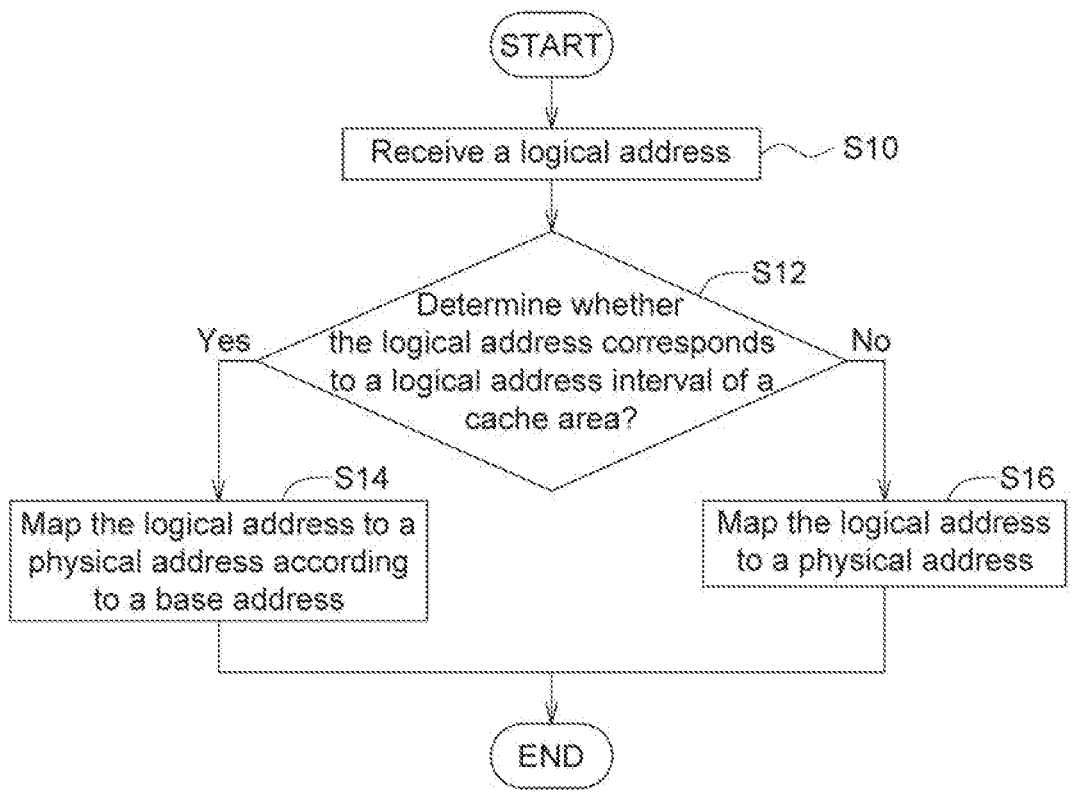
FIG. 4 is a flowchart of a cache area addressing method according to an embodiment of the present invention.
Figure 5:
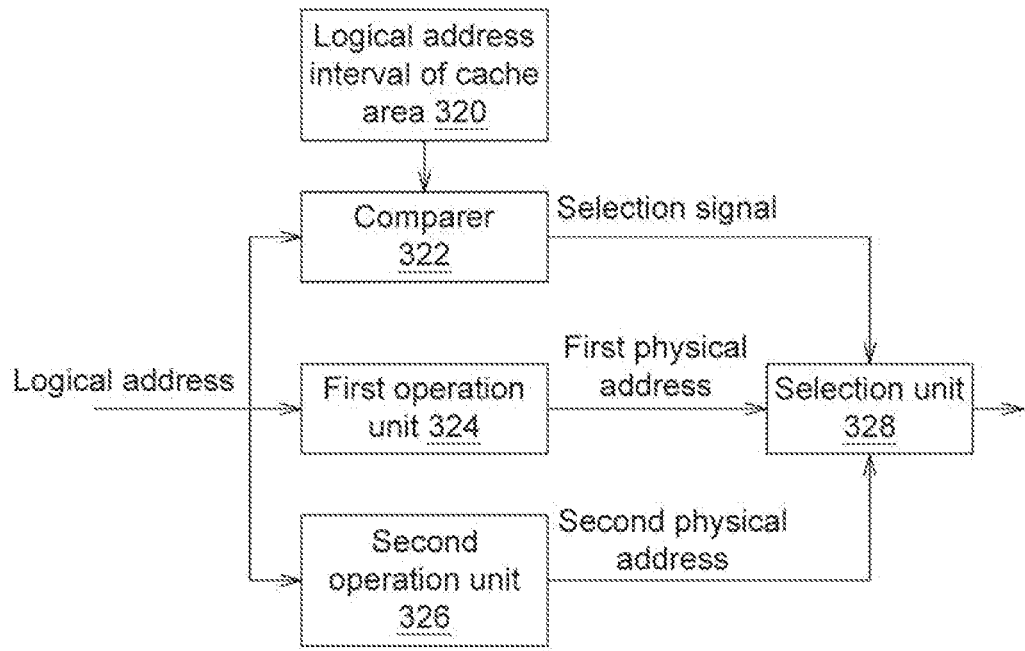
FIG. 5 is a block diagram of a cache area addressing circuit according to an embodiment of the present invention.

FIG. 4 is a flowchart of a cache area addressing method according to an embodiment of the present invention. The cache area addressing method of the present invention preferably is performed by the cache area addressing circuit 32. The cache area addressing circuit 32 as shown in FIG. 5 can be coupled between the memory controller 30 and the buffer 40. Preferably, the cache area addressing circuit 32 is integrated in the memory controller 30 and configured to map the logical address, which the memory controller 30 intends to access, to correct physical address.

Firstly, the logical address interval of the cache area 320 is set by the memory controller 30. For example, the initial logical address of the cache area is set as 0x6000,0000, the ending logical address is set as 0x7FFF,FFFF, and the base address is set as the physical address 0x0000,0000 of bank 0. Moreover, the cache area is preferably arranged in the system storage area. After the setting is completed, the cache area addressing method of the present invention can map the logical address for the cache area to correct physical address, and the details are disclosed below.

In step S10, a logical address is received by the cache area addressing circuit 32. The logical address, for example, 0x6100,0000, is preferably provided by the memory controller 30.

In step S12, whether the logical address corresponds to the logical address interval of the cache area 320 is determined by the cache area addressing circuit 32. Since the logical address interval of the cache area 320 includes all logical addresses between the initial logical address and the ending logical address, the comparer 322 of the cache area addressing circuit 32 can determine whether the logical address is greater than or equivalent to the initial logical address and less than or equivalent to the ending logical address. Since the logical address 0x6100,0000 is greater than 0x6000,0000 and less than 0x7FFF,FFFF, the determination result is affirmative, the logical address is arranged in the logical address interval 320, a selection signal having a first default value (such as "1") is outputted to the selection unit 328; otherwise, a selection signal having a second default value (such as "0") is outputted to the selection unit 328. To reduce the comparison time, the comparer 322 can compare only some values, such as the first value, of the logical address and the logical address interval 320. In the above example, the first value of the logical address interval 320 is 0x6 and 0x7, and the first value of the logical address is 0x6, therefore the determination result is affirmative. Suppose the logical address is 0x8000,0000. Since 0x8000, 0000 is greater than 0x7FFF,FFFF or 0x8 is not equivalent to 0x6 or 0x7, the logical address is arranged outside the logical address interval 320, the determination result is negative, and a selection signal having a value "0" is outputted to the selection unit 328. In an actual example, all logical addresses between 0x6000,0000 to 0x7FFF,FFFF are represented by binary codes. Since all of the three most significant bits are "011", the determination can be based on whether the three most significant bits of the logical address represented by binary codes are "011". If yes, "1" is outputted; if no, "0" is outputted.

In step S14, the logical address is mapped to physical address by the cache area addressing circuit 32 according to the base address, which is the initial physical address of the cache area. Suppose the initial physical address of the cache area is physical address 0x0000,0000 of bank 0. Then, the second operation unit 326 of the cache area addressing circuit 32 maps the logical address to the physical address according to the base address. For example, the second operation unit 326 maps the logical address 0x6000,0000 to the physical address 0x0000,0000 of bank 0, maps the logical address 0x6100,0000 to the physical address 0x0100,0000 of bank 0, and maps the logical address 0x7F00,0000 to the physical address 0x1F00,0000 of bank 0.

Figure 6A:
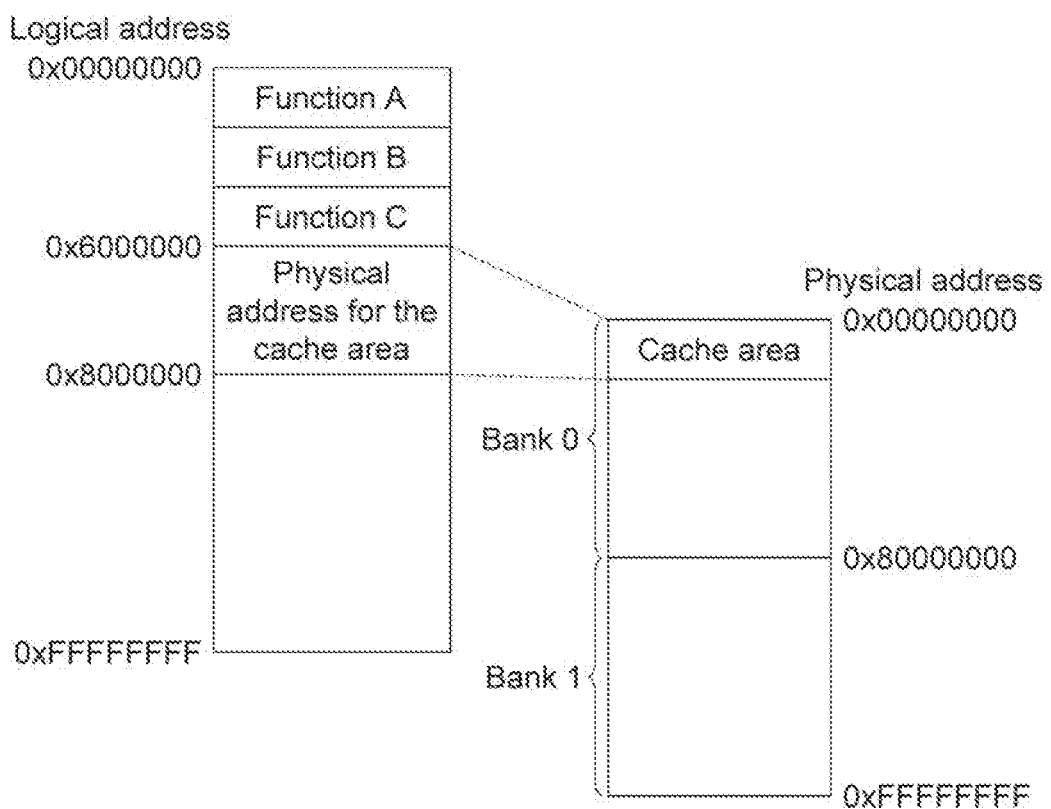
FIG. 6A is a schematic diagram of logical address arrangement according to an embodiment of the present invention.

The second operation unit 326 preferably includes of an operator and an adder. The operator subtracts the initial logical address from the logical address to generate an output value. In the above example, the output value obtained by subtracting the initial logical address 0x6000,0000 from the logical address 0x6100,0000 is 0x0100,0000. The adder can add the output value to the base address to generate a result value. In the above example, the result value obtained by adding 0x0100,0000 to the physical address 0x0000,0000 of bank 0 is the physical address 0x0100,0000 of bank 0, which is the second physical address. Based on the selection signal "1", the selection unit 328 outputs the second physical address as the physical address in the cache area to which the logical address should correspond as indicated in FIG. 6A.

Figure 6B:
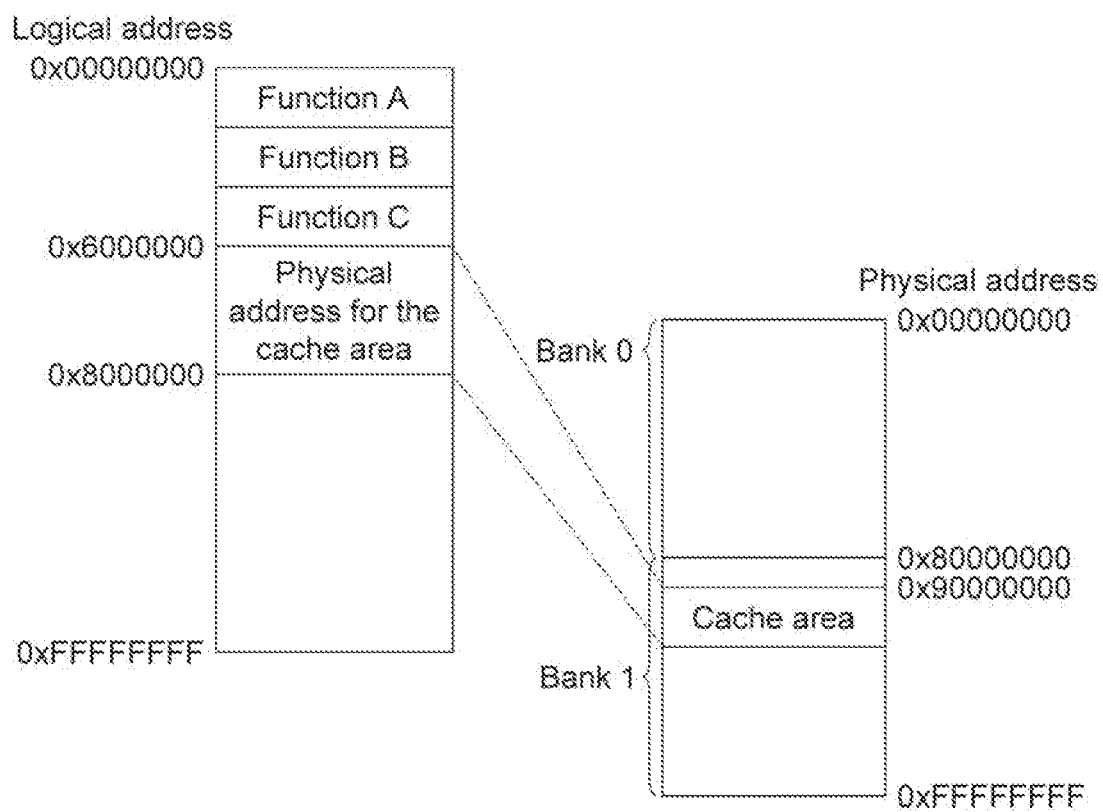
FIG. 6B a schematic diagram of logical address arrangement according to another embodiment of the present invention.

Suppose the base address is the physical address 0x1000,0000 of bank 1. After the logical address 0x6100,0000 is operated by the operator of the second operation unit 326, the output value is 0x0100,0000. After the output value is 0x0100,0000 is added to the base address by the adder, the result value is the physical address 0x1100,0000 of bank 1. Based on the selection signal "1", the selection unit 328 outputs the physical address 0x1100,0000 of bank 1 as the physical address of the cache area as indicated in FIG. 6B.

As disclosed above, by setting suitable base address, the cache area addressing circuit 32 can switch the value of the bank in the buffer 40 or can inform the memory controller 30 of the value of the bank that needs to be switched in the buffer 40. Thus, the problem of cache area addressing error, which occurs when the value of the bank in the buffer 40 is not switched, can therefore be avoided.

In step S16, the logical address is mapped to the physical address by the cache area addressing circuit 32. If the logical address is arranged outside the logical address interval 320, this indicates that the logical address should be mapped to the physical address in the universal storage area, and the first operation unit 324 of the cache area addressing circuit 32 generates a first physical address according to the logical address. Based on the selection signal "0", the selection unit 328 outputs the first physical address as the physical address in the universal storage area to which the logical address correspond.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A storage device, comprising:
    a memory module;
    a buffer, comprising a cache area and a plurality of banks, wherein the cache area is arranged in one of the banks;
    a memory controller coupled to the memory module and the buffer, comprising a logical address arrangement, wherein the logical arrangement comprises a logical address interval corresponding to the cache area and a first logical address interval, the logical address interval is free of overlapping with the first logical address interval, and a size of the first logical address interval is equivalent to a size of each of the banks; and
    a cache area addressing circuit coupled to the memory controller and the buffer, and configured to perform:
        receiving a logical address from the memory controller;
        determining whether the logical address corresponds to the logical address interval corresponding to the cache area;
        when the logical address corresponds to the logical address interval corresponding to the cache area, mapping the logical address to a first physical address in the cache area according to a base address; and
        when the logical address does not correspond to the logical address interval corresponding to the cache area, mapping the logical address to a second physical address in the buffer.

2. The storage device according to claim 1, wherein the cache area addressing circuit comprises:
    a comparer configured to generate a selection signal according to the logical address and the logical address interval corresponding to the cache area;
    a first operation unit configured to map the logical address to the first physical address in the cache area according to the base address;
    a second operation unit configured to map the logical address to the second physical address in the buffer; and
    a selection unit coupled to the comparer, the first operation unit and the second operation unit, and configured to output one of the first physical address and the second physical address according to the selection signal.

3. The storage device according to claim 2, wherein the logical address interval of the cache area comprises an initial logical address and an ending logical address, the comparer determines whether the logical address is greater than or equivalent to the initial logical address and less than or equivalent to the ending logical address; when the logical address is greater than or equivalent to the initial logical address and less than or equivalent to the ending logical address, then the comparer determines that the logical address corresponds to the logical address interval corresponding to the cache area and outputs the selection signal having a first default value; when the logical address is less than the initial logical address or greater than the ending logical address, then the comparer determines that the logical address does not correspond to the logical address interval corresponding to the cache area and outputs the selection signal having a second default value.

4. The storage device according to claim 2, wherein the comparer compares some values of the logical address with some values of the logical address interval corresponding to the cache area to determine whether the logical address corresponds to the logical address interval corresponding to the cache area.

5. The storage device according to claim 1, wherein the cache area addressing circuit is integrated in the memory controller.

6. A cache area addressing method, comprising:
receiving a logical address, from a memory controller comprising a logical address arrangement, by a cache area addressing circuit;
determining whether the logical address corresponds to a logical address interval corresponding to a cache area of a buffer comprising the cache area and a plurality of banks, by the cache area addressing circuit;
when the logical address corresponds to the logical address interval of the cache area, mapping the logical address to a first physical address in the cache area by the cache area addressing circuit according to a base address; and
when the logical address does not correspond to the logical address interval corresponding to the cache area, mapping the logical address to a second physical address in the buffer by the cache area addressing circuit,
wherein the cache area is arranged in one of the banks, the logical arrangement comprises the logical address interval corresponding to the cache area and a first logical address interval, the logical address interval is free of overlapping with the first logical address interval, and a size of the first logical address interval is equivalent to a size of each of the banks.

7. The cache area addressing method according to claim 6, wherein in the step of determining whether the logical address corresponds to a logical address interval corresponding to a cache area of a buffer by the cache area addressing circuit, the cache area addressing circuit generates a selection signal according to the determination result, and the cache area addressing method further comprises:
outputting one of the first physical address and the second physical address by the cache area addressing circuit according to the selection signal.

8. The cache area addressing method according to claim 7, wherein the logical address interval of the cache area comprises an initial logical address and an ending logical address, the cache area addressing circuit determines whether the logical address is greater than or equivalent to the initial logical address and less than or equivalent to the ending logical address; when the logical address is greater than or equivalent to the initial logical address and less than or equivalent to the ending logical address, the cache area addressing circuit determines that the logical address corresponds to the logical address interval corresponding to the cache area and outputs the selection signal having a first default value; when the logical address is less than the initial logical address or greater than the ending logical address, the cache area addressing circuit determines that the logical address does not correspond to the logical address interval corresponding to the cache area and outputs the selection signal having a second default value.

9. The cache area addressing method according to claim 7, wherein the cache area addressing circuit compares some values of the logical address with some values of the logical address interval of the cache area to determine whether the logical address corresponds to the logical address interval corresponding to the cache area.

10. The cache area addressing method according to claim 6, wherein when the cache area addressing circuit maps the logical address to the first physical address according to the base address, the cache area addressing circuit performs an addition operation or a subtraction operation to the logical address and the base address to generate the first physical address.

* * * * *